(12) United States Patent
Tanaka et al.

(10) Patent No.: US 7,578,625 B2
(45) Date of Patent: Aug. 25, 2009

(54) OPTICAL FIBER ARRAY

(75) Inventors: Hironori Tanaka, Ibi-Gun (JP); Naoaki Fujii, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/529,318

(22) Filed: Sep. 29, 2006

(65) Prior Publication Data

US 2007/0019920 A1 Jan. 25, 2007

Related U.S. Application Data

(63) Continuation of application No. PCT/JP2005/005615, filed on Mar. 18, 2005.

(30) Foreign Application Priority Data

Mar. 30, 2004 (JP) .............................. 2004-100872

(51) Int. Cl.
*G02B 6/36* (2006.01)
*G02B 6/38* (2006.01)
(52) U.S. Cl. .............................. 385/89; 385/59; 385/52
(58) Field of Classification Search .................. 385/89, 385/59, 52
See application file for complete search history.

(56) References Cited

U.S. PATENT DOCUMENTS

| | | | | |
|---|---|---|---|---|
| 4,818,059 A | * | 4/1989 | Kakii et al. | 385/65 |
| 4,952,263 A | * | 8/1990 | Kakii et al. | 156/153 |
| 5,155,787 A | * | 10/1992 | Carpenter et al. | 385/98 |
| 5,361,382 A | * | 11/1994 | Nakamura et al. | 385/49 |
| 5,446,810 A | * | 8/1995 | Watanabe et al. | 385/22 |
| 6,519,406 B1 | * | 2/2003 | Fukuyama et al. | 385/137 |
| 6,748,156 B2 | * | 6/2004 | Saito et al. | 385/137 |
| 7,108,809 B2 | * | 9/2006 | Chan et al. | 264/1.25 |
| 2003/0021573 A1 | * | 1/2003 | Matsumoto et al. | 385/137 |
| 2003/0095776 A1 | * | 5/2003 | Saito et al. | 385/137 |
| 2005/0129380 A1 | * | 6/2005 | Takeuchi et al. | 385/137 |
| 2005/0254770 A1 | * | 11/2005 | Watanabe | 385/137 |
| 2007/0122085 A1 | * | 5/2007 | Takahashi et al. | 385/83 |

FOREIGN PATENT DOCUMENTS

| | | |
|---|---|---|
| EP | 1 139 131 A1 | 10/2001 |
| JP | 3-90202 U | 9/1991 |
| JP | 5-323154 A | 12/1993 |
| JP | 05323154 A * | 12/1993 |
| JP | 06-082656 A | 3/1994 |
| JP | 2001-343547 A | 12/2001 |
| JP | 2003-337245 A | 11/2003 |
| JP | 2003-344688 A | 12/2003 |

* cited by examiner

*Primary Examiner*—K. Cyrus Kianni
(74) *Attorney, Agent, or Firm*—Oblon, Spivak, McClelland, Maier & Neustadt, P.C.

(57) ABSTRACT

An optical fiber array 10 includes: a substrate 30 with housing grooves 34 for housing optical fibers 24 formed therein; a cover plate 12 for covering the optical fibers 24 that are housed in the housing grooves 34; and an adhesive layer 16 for joining the substrate 30 with the optical fibers 24 being housed in the housing grooves 34 and the coverplate 12. In the substrate 30, there are formed adhesive grooves 36 for introduction of the adhesive layer 16 between the housing grooves 34 for housing the optical fibers 24 and the end portions of the substrate 30.

11 Claims, 7 Drawing Sheets

Fig. 5

|  | Occupation rate G/W | Adhesive groove depth (μm) | Adhesive groove angle (°) | Housing groove depth (μm) | Housing groove angle (°) |
|---|---|---|---|---|---|
| Example 1 | 0.03 | 10 | 70 | 150 | 70 |
| Example 2 | 0.05 | 10 | 70 | 150 | 70 |
| Example 3 | 0.10 | 10 | 70 | 150 | 70 |
| Example 4 | 0.70 | 10 | 70 | 150 | 70 |
| Example 5 | 0.98 | 10 | 70 | 150 | 70 |
| Example 6 | 0.70 | 70 | 70 | 150 | 70 |
| Example 7 | 0.70 | 150 | 70 | 150 | 70 |
| Example 8 | 0.70 | 300 | 70 | 150 | 70 |
| Comparative Example 1 | 0.00 | 0 | – | 150 | 70 |
| Comparative Example 2 | 0.70 | 7 | 70 | 150 | 70 |
| Comparative Example 3 | 0.70 | 450 | 70 | 150 | 70 |

|  | Occupation rate G/W | Adhesive groove depth (μm) | Adhesive groove angle (°) | Boiling test | | | Coupling loss (dB) |
|---|---|---|---|---|---|---|---|
|  |  |  |  | 15h | 36h | 60h |  |
| Example 1 | 0.03 | 10 | 70 | ○ | ○ | ○ | 0.08 |
| Example 2 | 0.05 | 10 | 70 | ○ | ○ | ○ | 0.09 |
| Example 3 | 0.10 | 10 | 70 | ○ | ○ | ○ | 0.13 |
| Example 4 | 0.70 | 10 | 70 | ○ | ○ | ○ | 0.12 |
| Example 5 | 0.98 | 10 | 70 | ○ | ○ | ○ | 0.1 |
| Example 6 | 0.70 | 70 | 70 | ○ | ○ | ○ | 0.13 |
| Example 7 | 0.70 | 150 | 70 | ○ | ○ | ○ | 0.13 |
| Example 8 | 0.70 | 300 | 70 | ○ | ○ | ○ | 0.15 |
| Comparative Example 1 | 0.00 | 0 | – | ○ | × | × | 0.62 |
| Comparative Example 2 | 0.70 | 7 | 70 | ○ | × | × |  |
| Comparative Example 3 | 0.70 | 450 | 70 | ○ | ○ | × | 0.42 |

OPTICAL FIBER ARRAY

CROSS-REFERENCE TO RELATED APPLICATIONS

The present invention is a continuation of International Application No PCT/JP2005/005615 filed on Mar. 18, 2005, which claims priority from Japanese Patent Application No. 2004-100872 filed on Mar. 30, 2004.

BACKGROUND ART

1. Field of the Invention

The present invention relates to an optical fiber array. The present invention claims priority from International Application No. PCT/JP2005/005615 filed on Mar. 18, 2005, which claims priority from Japanese Patent Application No. 2004-100872 filed on Mar. 30, 2004, and the contents of both of which are incorporated herein by reference in their entirety.

2. Description of the Related Art

There have conventionally been known optical fiber arrays in which a substrate with housing grooves for housing optical fibers formed therein and a cover plate for covering the optical fibers are joined with adhesive, wherein relationships such as distance between the substrate and the cover plate are defined to increase the adhesiveness therebetween. For example, the optical fiber array described in JP-A 2001-343547 keeps the distance between the outermost housing grooves and the end portions of the substrate, the distance Y between the substrate and the cover plate, and the distance L between the contact points through the housed optical fibers and the housing grooves and the cover plate, respectively, within certain ranges to increase the adhesive strength therebetween so as not to allow the optical fibers to be displaced from the center positions of the housing grooves, which prevents the transmission characteristics of optical signals from being degraded. There have also been known such kind of optical fiber arrays in which adhesive surfaces of a substrate and a cover plate are devised when joined with adhesive to increase the adhesive strength therebetween. For example, in the optical fiber array described in JP-A2001-343547, the surface between the housing grooves that are formed in the substrate to house the optical fibers and the end portions of the substrate is made to have rough surface to increase the adhesive area and thereby the adhesiveness, which prevents the transmission characteristics of optical signals from being degraded. The contents of JP-A 2001-343547 are incorporated herein by reference in their entirety.

SUMMARY OF THE INVENTION

It is preferable that an optical fiber array according to the present invention is comprising:

a substrate with housing grooves for housing optical fibers formed therein;

a cover plate for covering the optical fibers that are housed in the housing grooves; and an adhesive layer for joining the substrate with the optical fibers being housed in the housing grooves and the cover plate, wherein adhesive grooves for introduction of the adhesive layer are formed in the substrate between the outermost housing grooves among the housing grooves and the end portions of the substrate.

It is preferable that in the optical fiber array according to the present invention, wherein the adhesive grooves are each formed cross-sectionally into an approximately V shape, and the angle between the forming faces of the adhesive grooves is about 60 to about 80°.

It is preferable that in the optical fiber array according to the present invention, wherein the adhesive grooves are formed approximately parallel with the housing grooves.

It is preferable that in the optical fiber array according to the present invention, wherein the adhesive grooves are formed in the vicinity of the outer most housing grooves among the housing grooves.

It is preferable that in the optical fiber array according to the present invention, wherein the adhesive grooves are formed in the vicinity of the end portions of the substrate.

It is preferable that in the optical fiber array according to the present invention, wherein the adhesive grooves are each formed to have a depth of about 5 to about 200% of that of the housing grooves.

It is preferable that the optical fiber array according to the present invention, wherein the adhesive layer is formed of photosetting resin, while at least one of the substrate and the cover plate is formed of optically-transparent material.

It is preferable that the optical fiber array according to the present invention, wherein under the definition that the value of G/W is an occupation rate, where W is referred to as substrate end portions width representing the width between the opening edge of the outermost housing grooves and the end portion of the substrate, and G is referred to as total adhesive grooves width representing the summation of the widths of a plurality of the adhesive grooves when formed between the opening edges of the outermost housing grooves and the end portions of the substrate, the value of occupation rate G/W is in a range of about 0.03 to about 1.0.

BRIEF DESCRIPTION OF THE DRAWINGS

FIG. 5 is a table summarizing production conditions according to examples and comparative examples;

FIG. 7 is a table summarizing measurement results according to the examples and the comparative examples.

DESCRIPTION OF THE PREFERRED EMBODIMENTS

Figure 1:
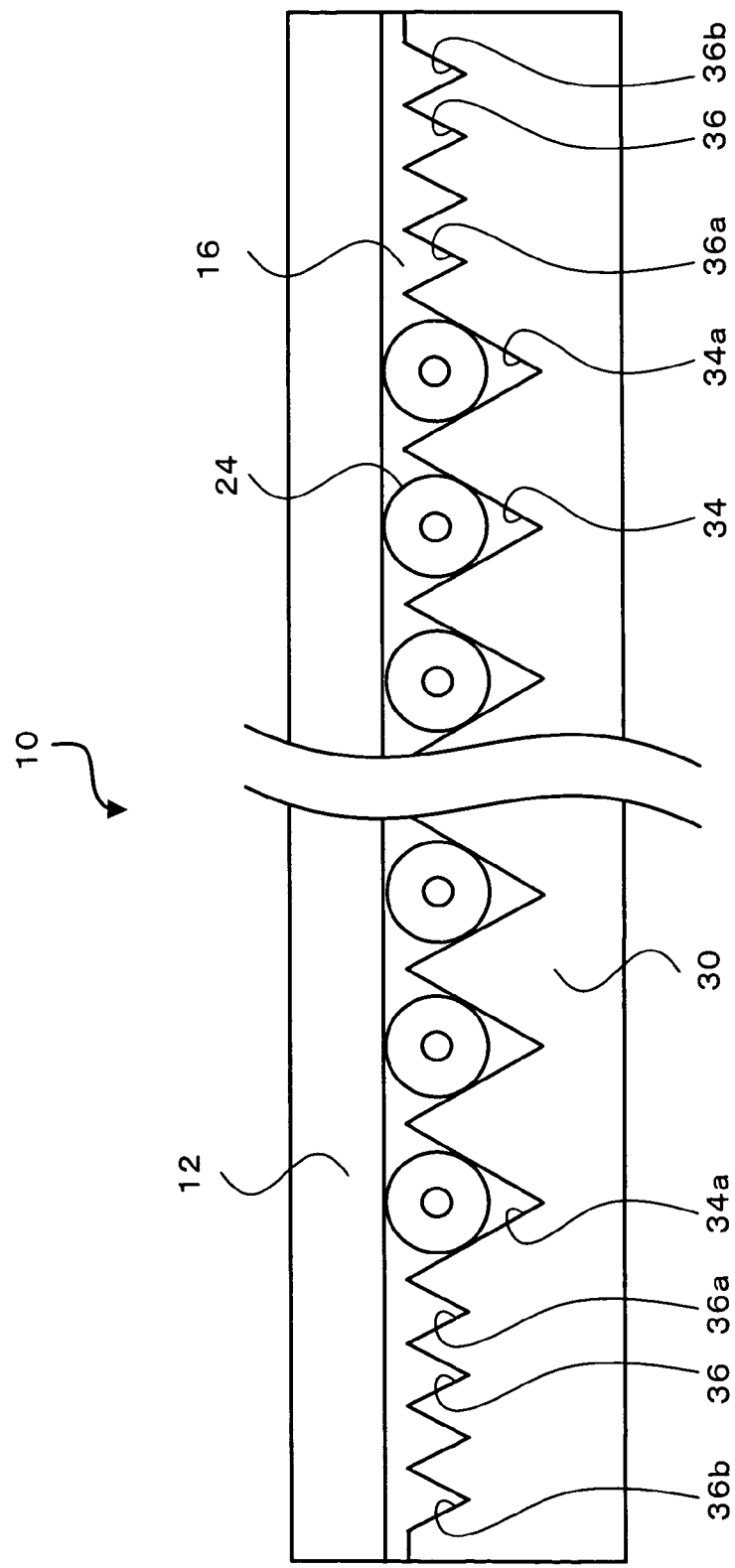
FIG. 1 is a front elevational view of an optical fiber array 10 according to an embodiment of the present invention.

An embodiment of an optical fiber array of the present invention includes:

a substrate with housing grooves for housing optical fibers formed therein;

a cover plate for covering the optical fibers that are housed in the housing grooves; and an adhesive layer for joining the substrate with the optical fibers being housed in the housing grooves and the cover plate, wherein adhesive grooves for introduction of the adhesive layer are formed in the substrate between the outermost housing grooves among the housing grooves and the end portions of the substrate.

In accordance with the embodiment of the above optical fiber array, since the adhesive grooves formed between the housing grooves and the end portions of the substrate are introduced thereinto the adhesive layer, it is possible to increase the adhesive area between the substrate and the cover plate. Although there may occur expansion/shrinkage due to curing shrinkage and/or heat in the adhesive layer, since the substrate has a rigidity greater than that of the adhesive layer, whereby the adhesive layer is introduced into the adhesive grooves to allow the forming faces of the adhesive grooves, it is possible to control the behavior of the adhesive layer caused by expansion/shrinkage in the adhesive layer. Since this increases the adhesiveness so as not to allow the optical fibers to be displaced in the housing grooves, it is possible to keep good transmission characteristics.

In the embodiment of the optical fiber array according to the present invention, the adhesive grooves are each preferably formed cross-sectionally into an approximately V shape, although not particularly restricted thereto. This allows the adhesive grooves to be formed in the surface of the substrate relatively easily. In this case, the angle $\theta$ between the forming faces of the adhesive grooves that are each formed cross-sectionally into an approximately V shape is preferably about 55 to about 95°, more preferably about 65 to about 85°, and most preferably about 60 to about 80°. When the angle $\theta$ is more than about 55°, it is easy to fill the bottom part of the V shape with adhesive, resulting in a possibility to prevent a crack and/or peeling of the adhesive layer starting from the bottom part of the V shape. When the angle $\theta$ is more than about 95°, it is easy to control the behavior of the adhesive layer by the forming faces of the adhesive grooves.

In the embodiment of the optical fiber array according to the present invention, the adhesive grooves may be formed approximately parallel with the housing grooves housing the optical fibers, although not particularly restricted thereto. Since this causes the scanning direction when forming the adhesive grooves to be approximately the same as that when forming the housing grooves, it is easy to form the adhesive grooves.

In the embodiment of the optical fiber array according to the present invention, the adhesive grooves are preferably formed in the vicinity of the outermost housing grooves among the housing grooves, although not particularly restricted thereto. This allows stress due to expansion/shrinkage in the adhesive layer that may be applied significantly onto the adhesive surface, etc., in the vicinity of the outermost housing grooves to be reduced by the forming faces of the adhesive grooves to easily increase the adhesive strength. Also, the adhesive grooves are preferably formed in the vicinity of the end portions of the substrate. This allows the adhesive area and thereby the adhesiveness in the end portions of the substrate, where there is a possibility of, for example, moisture immersing through the external limit between the substrate and the adhesive layer to reduce the adhesiveness therebetween, to be increased to keep good transmission characteristics.

In the embodiment of the optical fiber array according to the present invention, at least one adhesive groove is preferably formed between the outermost housing grooves among the housing grooves and the end portions of the substrate, and a plurality of the adhesive grooves may be formed, although not particularly restricted thereto. Even when only one adhesive groove is formed, the adhesive layer can be introduced thereinto so as to increase the adhesive area and the behavior of the adhesive layer due to expansion/shrinkage in the adhesive layer is easy to be controlled by the forming faces of the adhesive groove, thereby the adhesiveness is increased to keep good transmission characteristics. When a plurality of the adhesive grooves are formed, the adhesiveness is also increased to keep good transmission characteristics. Here, under the definition that the value of G/W is an occupation rate, where W is referred to as substrate end portions width representing the width between the opening edges of the outermost housing grooves and the end portions of the substrate, and G is referred to as total adhesive grooves width representing the summation of the widths of a plurality of the adhesive grooves when formed between the opening edges of the outermost housing grooves and the end portions of the substrate, the value of the occupation rate G/W is preferably in a range of about 0.03 to about 1.0. When the value of G/W is more than about 0.03, the area where the adhesive grooves are formed is so small that it is easy to control the behavior of the adhesive layer by the forming faces of the adhesive grooves.

In the embodiment of the optical fiber array according to the present invention, the adhesive grooves are each preferably formed to have a depth of about 5 to about 200% of that of the housing grooves. When the depth of the adhesive grooves is more than about 5% of that of the housing grooves, it is easy to control the behavior of the adhesive layer, while when the depth of the adhesive grooves is less than about 200% of that of the housing grooves, it may be difficult to fill the adhesive grooves with the adhesive layer, resulting in a prevention of reduction in adhesiveness.

In the embodiment of the optical fiber array according to the present invention, the adhesive layer for joining the substrate and the cover plate is used one or more kinds of resin selected among, for example, thermosetting resin, thermoplastic resin, and photosetting resin, although not particularly restricted thereto as long as the material can join the substrate and the cover plate to fix the optical fibers. The adhesive layer for joining the substrate and the cover plate is preferably formed of photosetting resin. When employing photosetting resin, at least one of the substrate and the cover plate is preferably formed of optically-transparent material. This allows light to be applied when curing the photosetting resin to penetrate through the substrate and/or the cover plate to be reflected and scattered at the adhesive grooves, which facilitates the degree of curing to be accelerated and the state of curing to be homogenized, resulting in an increase in the adhesiveness of the photosetting resin.

Figure 2:
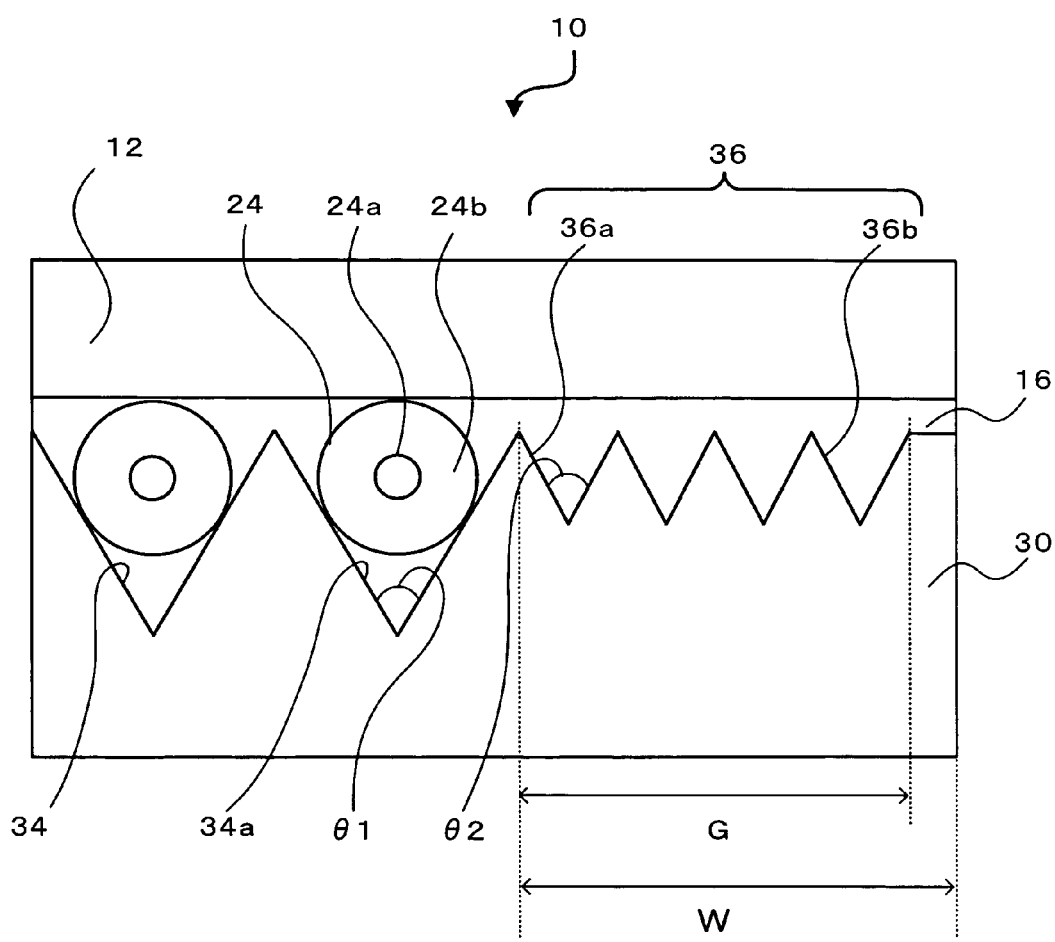
FIG. 2 is a partially enlarged view of one end portion of the optical fiber array 10 according to the embodiment of the present invention.
Figure 3:
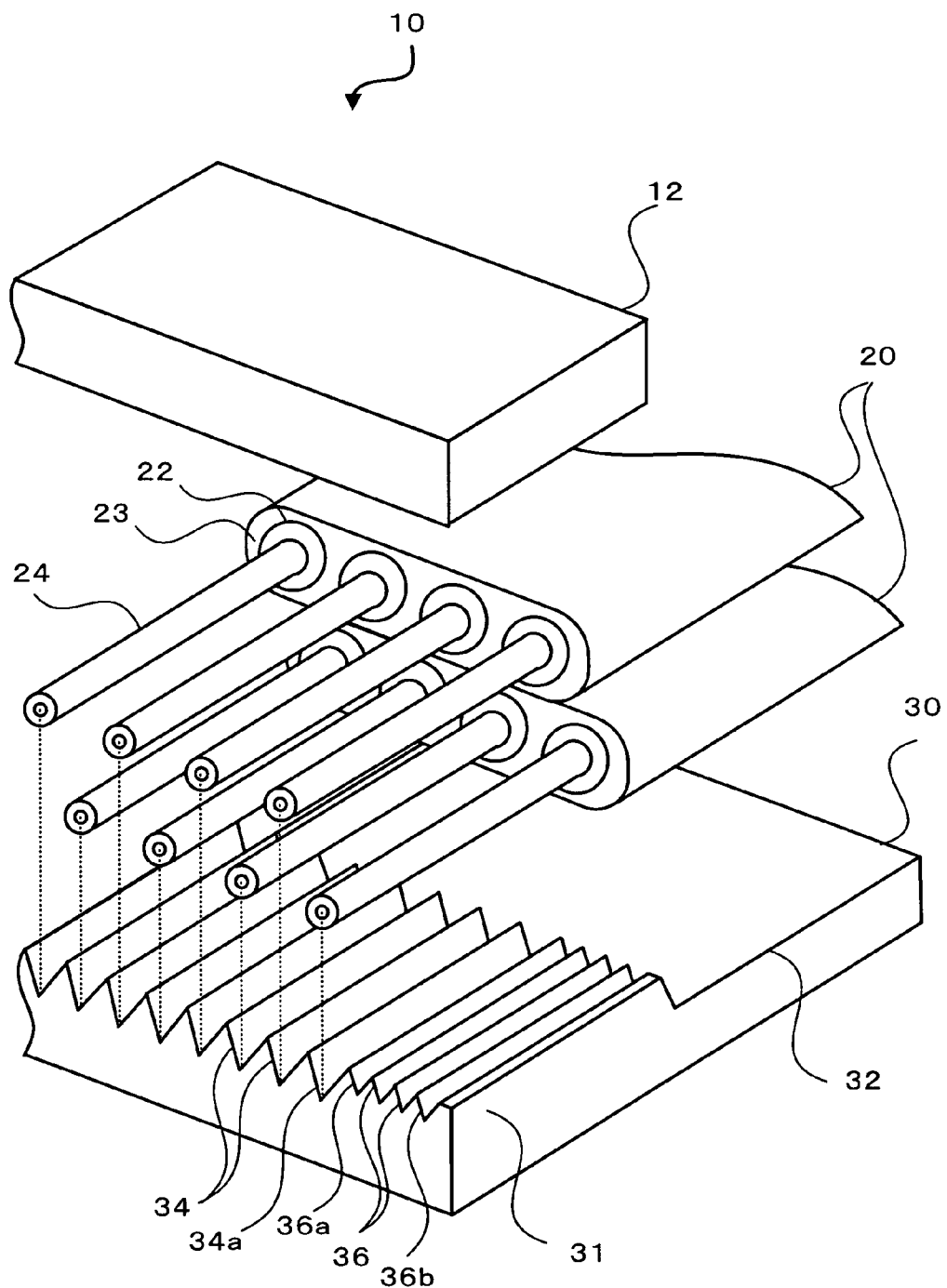
FIG. 3 is a disassembled perspective view of the optical fiber array 10 according to the embodiment of the present invention.

Next will be described the embodiment of the present invention based on the accompanying drawings. FIG. 1 is a front elevational view of an optical fiber array 10 according to the embodiment of the present invention; FIG. 2 is a partially enlarged view of one end portion of the optical fiber array 10 according to the embodiment of the present invention; and FIG. 3 is a disassembled perspective view of the optical fiber array 10 according to the embodiment of the present invention. As shown in FIG. 3, the optical fiber array 10 includes: optical fibers 24 drawn out from optical fiber ribbons 20; a substrate 30 with housing grooves 34 for housing the optical fibers 24 formed therein; a cover plate 12 for covering the optical fibers 24 that are housed in the housing grooves 34; and an adhesive layer 16 for joining the substrate 30 and the cover plate 12 (refer to FIG. 2). It is noted that although the optical fiber array 10 is arranged in such a manner that the optical fibers 24 drawn out from the two tiered optical fiber ribbons 20 are fixed by the substrate 30 and the cover plate 12 (refer to FIG. 3), the arranging manner is not restricted thereto, and it may be arranged that the optical fibers 24 drawn out from one tiered optical fiber ribbon 20 or multiple tiered optical fiber ribbons 20 are fixed by the substrate 30 and the cover plate 12.

The optical fiber ribbons 20 are each formed into a ribbon shape by bundling and coating several optical fibers 24 (e.g. 8 fibers) coated with first coating portions 22 with a second coating portion 23. The optical fibers 24 are made of glass to transmit optical signals therethrough, in which around a core 24a for transmitting optical signals therethrough, there is formed a clad 24b as a glass layer having a refractive index different from that of the core 24a (refer to FIG. 2). The first coating portions 22 and the second coating portions 23 are adapted to coat and protect the optical fibers 24, and are formed of UV acrylic resin. It is noted that the diameter of the optical fibers 24 is 125 µm, while 250 µm with being coated with the first coating portions 22, and the diameter of the cores 24a is 9 µm. Also, ribbon-shaped ones are used here, but not particularly restricted thereto as long as the optical fibers 24 can be drawn out therefrom, and multicore cables may be used, for example.

The substrate 30 is a member for fixing the optical fibers 24 that are drawn out from the optical fiber ribbons 20. The material of the substrate 30 is not particularly restricted as long as it has an excellent flatness and a high shape-retaining performance when the outer shape is processed, and there can be cited, for example, inorganic materials such as glass, silicon, and ceramic, metallic materials such as copper, iron, and nickel, and organic materials such as engineering plastic. Among the materials, inorganic materials, which are less likely to be deformed by heat and humidity, are preferable, and the substrate is here formed of transparent glass. The width of the substrate 30 is formed within about 2 to about 15 mm (preferably about 5 to about 9 mm); the length (in the axial direction of the optical fibers 24) of the substrate 30 is formed within about 5 to about 20 mm (preferably about 10 to about 15 mm); and the thickness of the substrate 30 is formed within about 0.5 to about 2.0 mm (preferably about 1.0 to about 1.5 mm). The substrate 30 includes a fiber mounting portion 31 for mounting the optical fibers 24 that are drawn out from the optical fiber ribbons 20 thereon and a ribbon mounting portion 32 for mounting the optical fiber ribbons 20 thereon.

In the fiber mounting portion 31, there are formed the housing grooves 34 for housing the optical fibers 24 and adhesive grooves 36 for introduction of the adhesive layer 16. A plurality of the housing grooves 34 (e.g. 32 grooves) are provided in the upper surface of the fiber mounting portion 31 from the ribbon mounting portion 32 side toward the front side at a given array pitch, for example, at approximately the same array pitch (e.g. 127 µm) as the diameter of the optical fibers 24. The housing grooves 34 are each formed cross-sectionally into a V shape so as to be capable of sufficiently stably fixing the optical fibers 24, and specifically to have a depth (e.g. 150 µm) greater than the diameter of the optical fibers 24 with the angle θ1 (refer to FIG. 2) between the forming faces of the housing grooves 34 being within about 55 to about 95° (e.g. 70°). It is noted that for the sake of convenience in description, the outermost housing grooves 34 will be referred to as housing grooves 34a.

Figure 4:
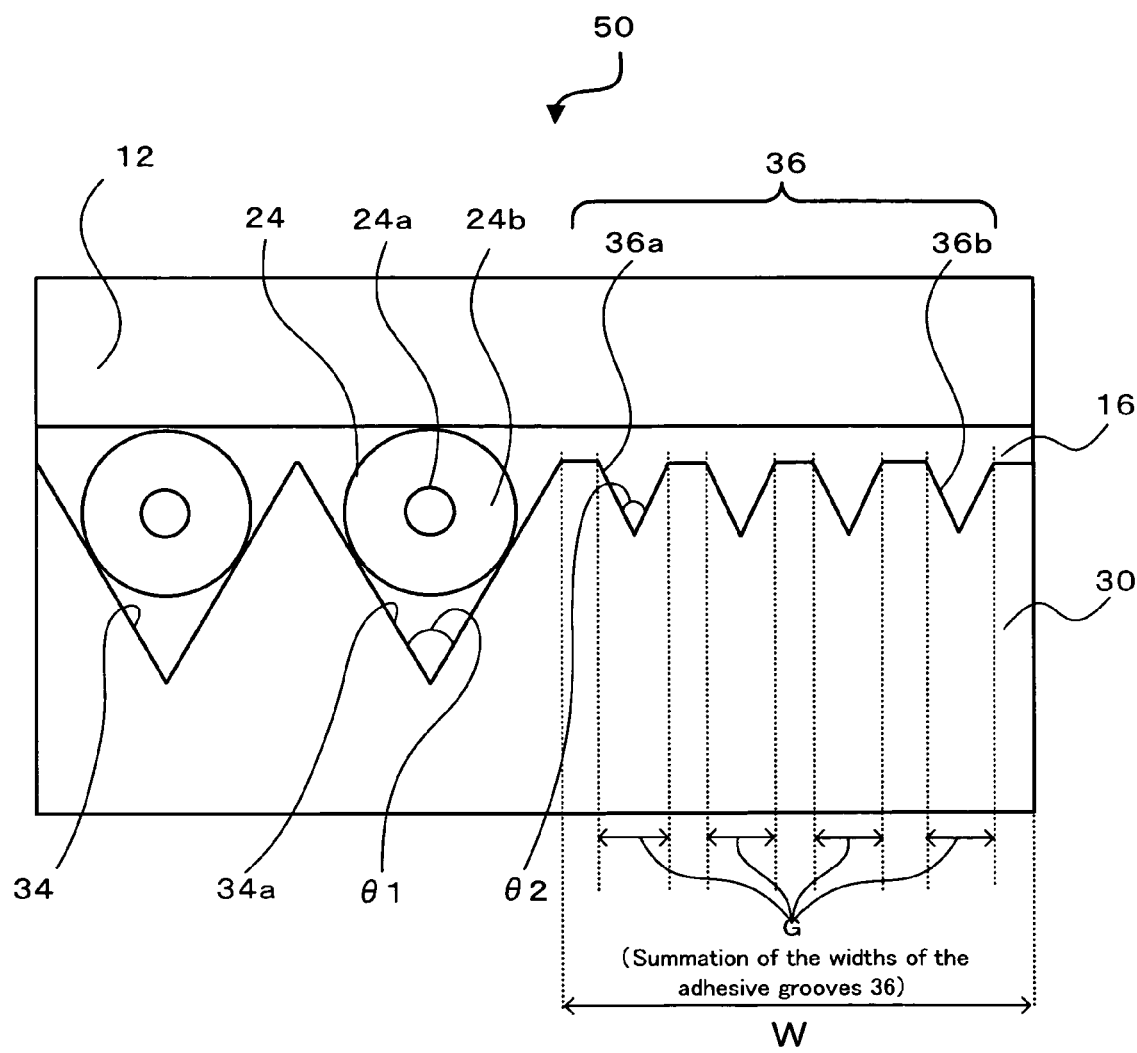
FIG. 4 is a partially enlarged view of one end portion of an optical fiber array 50 according to another embodiment of the present invention.

The adhesive grooves 36 are formed between the opening edges of the outermost housing grooves 34a and the end portions of the substrate 30 for introduction of the adhesive layer 16. It is noted that the adhesive grooves 36 are here formed cross-sectionally into a V shape, although not particularly restricted thereto as long as the shape can increase the adhesive area and control the behavior of the adhesive layer 16 due to expansion/shrinkage with the adhesive layer 16 being introduced therein. The angle θ2 (refer to FIG. 2) between the forming faces of the adhesive grooves 36 that are each formed cross-sectionally into a V shape is preferably about 55 to about 95°, more preferably about 65 to about 85°, and most preferably about 60 to about 80°. When the angle θ2 is more than about 55°, it is easy to fill the bottom part of the V shape with adhesive, resulting in a possibility to prevent a crack and/or peeling of the adhesive layer 16 starting from the bottom part of the V shape, while when the angle θ2 is less than about 95°, it is easy to control the behavior of the adhesive layer by the forming faces of the adhesive grooves 36. The angle θ2 here employs 70°. The depth of the adhesive grooves 36 is preferably about 5% or more to about 200% or less of that of the housing grooves 34, and the adhesive grooves 36 are here formed to have a depth of about 10 to about 300 µm for the depth of the housing grooves 34 of 150 µm. When the depth of the adhesive grooves is more than about 5% of that of the housing grooves, it is easy to control the behavior of the adhesive layer, while when the depth of the adhesive grooves is less than about 200% of that of the housing grooves, it may not be difficult to fill the adhesive grooves with adhesive, resulting in a prevention of reduction in adhesiveness. The adhesive grooves 36 are formed parallel with the housing grooves 34 for housing the optical fibers. It is noted that the direction in which the adhesive grooves 36 are formed is not particularly restricted thereto, and may be formed in any direction. The adhesive grooves 36 are preferably formed in the vicinity of the outermost housing grooves 34a and of the end portions of the substrate 30. It is noted that for the sake of convenience in description, the adhesive grooves 36 formed in the vicinity of the housing grooves 34a will be referred to as adhesive grooves 36a, while those formed in the vicinity of the end portions of the substrate 30 as adhesive grooves 36b (refer to FIGS. 1 and 2). Here, the value of G/W is defined as an occupation rate, where W is referred to as substrate end portions width representing the width between the opening edge of the housing grooves 34a and the end portion of the substrate 30, and G is referred to as total adhesive grooves width representing the summation of the widths of a plurality of the adhesive grooves 36 when formed between the opening edges of the housing grooves 34a and the end portions of the substrate 30. The value of the occupation rate G/W is preferably in a range of about 0.03 to about 1.0, and the number of the adhesive grooves 36 may be selected appropriately so as to keep the range. When the value of G/W is more than about 0.03, the area where the adhesive grooves are formed is so large that it is easy to control the behavior of the adhesive layer by the forming faces of the adhesive grooves. It is noted that although FIG. 1 to FIG. 3 show the case where a plurality of adhesive grooves 36 are formed continuously, the adhesive grooves 36 may be formed to have a certain interval there between as shown in FIG. 4. Here, the housing grooves 34 and the adhesive grooves 36 may be formed, for example, by cutting the substrate 30 in the direction in which the grooves are to be formed using a groove forming machine (e.g. dicing saw) or by applying resist to the substrate 30 and then removing the resist in the direction in which the grooves are to be formed by means of a photographic method to perform an etching process.

The ribbon mounting portion 32 is for mounting and fixing the optical fiber ribbons 20 thereon, and is formed unevenly with respect to the fiber mounting portion 31 so that the optical fibers 24 drawn out from the optical fiber ribbons 20 are housed in the housing grooves 34. The length (in the axial direction of the optical fibers 24) of the ribbon mounting portion 32 is formed so that the optical fiber ribbons 20 can be placed thereon stably, for example, and may be determined appropriately in accordance with the shape of the optical fiber ribbons, etc., to be used. Also, the depth of the ribbon mounting portion 32 is formed within a range where the optical fibers 24 drawn out, respectively, from the first and second tiered optical fiber ribbons 20 are bent by the same amount, for example.

The cover plate 12 is a member for covering the optical fibers 24 that are housed in the housing grooves 34. The cover plate 12 is preferably formed of the same material as that of the substrate 30, and is here formed of transparent glass. The width of the cover plate 12 may be approximately the same as that of the substrate 30, but is preferably smaller than that of the substrate 30. The thickness of the cover plate 12 is formed to be approximately the same as that of the substrate 30, while the length (in the axial direction of the optical fibers 24) of the cover plate 12 is formed within about 2 to about 10 mm (preferably about 4 to about 10 mm). Since the thickness of the substrate 30 is approximately the same as that of the cover plate 12, it is possible to prevent warpage of the optical fiber array 10. It is noted that the optical fibers 24 from which the first coating portions 22 are removed from the cover plate 12 through the ribbon mounting portion 32 will be coated and protected with the adhesive forming the adhesive layer 16 or some other adhesive, etc.

The adhesive layer 16 is for joining the substrate 30 and the cover plate 12 to fix the optical fibers 24. The material of the adhesive layer 16 is not particularly restricted as long as it has capable of joining the substrate 30 and the cover plate 12 to fix the optical fibers 24, and there can be cited one or more kinds of resin selected among, for example, thermosetting resin such as epoxy resin and phenol resin, thermoplastic resin such as polysulphone and polyimide, and photosetting resin such as acrylic resin and ultraviolet-curing resin. The layer is here formed of photosetting resin adhesive (UV acrylic resin). The adhesive layer 16 is formed by putting uncured adhesive into the housing grooves 34 with the optical fibers 24 housed therein and the adhesive grooves 36 and then applying ultraviolet rays to cure the adhesive. Using photosetting resin allows light to be applied when curing the photosetting resin to be reflected and scattered at the adhesive grooves 36, which facilitates the state of curing to be homogenized. It is noted that in the case of using photosetting resin, the substrate 30 and the cover plate 12 are preferably formed of optically-transparent material (e.g. glass). Also, the adhesive layer 16, the thermal expansion coefficient of which is greater than that of the substrate 30 and the cover plate 12 by one or more orders, is easy to be expanded/shrinked under the effect of temperature.

In the thus produced optical fiber array 10, since the adhesive layer 16 is introduced into the adhesive grooves 36 that are formed between the housing grooves 34a and the end portions of the substrate 30 as shown in FIG. 2, it is possible to increase the adhesive area between the substrate 30 and the cover plate 12. Although there can occur expansion/shrinkage due to curing shrinkage and/or heat of the adhesive in the adhesive layer 16, since the substrate 30 has a rigidity greater than that of the adhesive layer 16, whereby the adhesive layer 16 is introduced into the adhesive grooves 36 to allow the forming faces of the adhesive grooves 36, it is possible to control the behavior of the adhesive layer 16 caused by expansion/shrinkage in the adhesive layer 16.

As described above in detail, in accordance with the optical fiber array 10 according to the embodiment of the present invention, since the adhesiveness between the substrate 30 and the cover plate 12 is increased so as not to allow the optical fibers 24 to be displaced in the housing grooves 34, it may be difficult to keep good transmission characteristics. Also, since the adhesive grooves 36 are each formed cross-sectionally into a V shape parallel with the housing grooves 34 for housing the optical fibers, it is possible to form the adhesive grooves in the substrate 30 relatively easily. Further, stress due to expansion/shrinkage in the adhesive layer 16 that may be applied significantly onto the adhesive surface, etc., in the vicinity of the outermost housing grooves 34a can be reduced by the forming faces of the adhesive grooves 36a that are formed in the vicinity of the housing grooves 34a to increase the adhesive strength. Furthermore, since the adhesive grooves 36b are formed in the end portions of the substrate 30, the adhesive area in the end portions of the substrate 30 can be increased to prevent moisture from immersing through between the substrate 30 and the adhesive layer 16, resulting in an increase in adhesiveness. Then, since the adhesive grooves 36 are each formed to have a depth of about 5 to about 200% of that of the housing grooves 34, it is easy to control the behavior of the adhesive layer 16, resulting in an increase in adhesiveness. Further, since the substrate 30 and the cover plate 12 are formed of highly optically-transparent glass and photosetting resin is employed as the adhesive forming the adhesive layer 16, light to be applied when curing the photosetting resin is reflected and scattered at the adhesive grooves 36 to facilitate the degree of curing to be accelerated and the state of curing to be homogenized, resulting in an increase in the adhesiveness of the photosetting resin.

EXAMPLES

Examples and comparative examples of optical fiber arrays that are produced under various conditions will hereinafter be described, but the present invention is not restricted to any of these examples.

Example 1

A substrate 30 was cut out from a flat plate made of borosilicate glass to have a dimension of 9 mm width×12 mm length×1.5 mm thickness, and a ribbon mounting portion 32 (having a length of 4 mm) was formed in the rear part thereof. Next, 16 housing grooves 34 having a cross-sectionally V shape were formed on either side of the center of a fiber mounting portion 31 (32 grooves in total) at an array pitch of about 127 µm. The housing grooves 34 have an angle θ1 of 70°, a depth of 150 µm, and the same length (in the axial direction of optical fibers 24) as that of the cover plate 12. The housing grooves 34 were formed within a range of 3 mm on either side of the center of the fiber mounting portion 31 (about 6 mm in total). Next, adhesive grooves 36 were formed between the opening edges of the outermost housing grooves 34s and the end portions of the substrate 30. It is noted that in the Example 1, the adhesive grooves 36 were formed only in the vicinity of the outermost housing grooves 34a. That is, one adhesive groove 36a was formed on either side (two grooves in total). The adhesive grooves 36 have an angle θ2 of 70°, a depth of 10 µm, and the same length (in the axial direction of the optical fibers 24) as that of the cover plate 12. Also, the cover plate 12 was produced by cutting a flat plate made of borosilicate glass to have a dimension of 9 mm width×5 mm length×1.5 mm thickness. Subsequently, eight first-coated optical fibers 24 were bundled to prepare an optical fiber ribbon 20. The optical fibers 24 were formed of silica glass. Four optical fiber ribbons 20 were produced with optical fibers 24 being drawn out therefrom by peeling the first coating portions 22 (having a diameter of about 250 µm) and the second coating portions 23 of the optical fiber ribbons 20 using a stripper, and were arranged horizontally and vertically on the ribbon mounting portion 32 to house the drawn optical fibers 24 in the housing grooves 34. Then, adhesive was put into the housing grooves 34 with the optical fibers 24 housed therein and the adhesive grooves 36, etc., to be fixed with the cover plate 12. UV acrylic resin was employed as the adhesive and was cured by applying ultraviolet rays. The cured adhesive formed an adhesive layer 16. Finally, portions of the adhesive layer 16 and/or the optical fibers 24 protruding from the substrate 30 were cut or polished to obtain an optical fiber array 10 according to the Example 1. It is noted that the cutting and grooving operations were performed using a diamond cutter and/or a diamond saw, etc. A table summarizing each value of the occupation rate G/W, adhesive groove depth, adhesive groove angle, housing groove depth, and housing groove angle of the optical fiber array 10 according to the present Example 1 is shown in FIG. 5. It is noted that the table in FIG. 5 also summarizes information about Example 2 to Example 8 and Example 1 to Comparative Example 3 to be described hereinafter.

Example 2 to Example 8

Substrates 30 were produced under the conditions of Example 2 to Example 8 shown in the table in FIG. 5 using a cover plate 12, optical fibers 24, and adhesive equivalent to those in the Example 1, and the same processes as shown in the Example 1 were performed to produce optical fiber arrays 10 each having an occupation rate G/W, adhesive groove depth, adhesive groove angle, housing groove depth, and housing groove angle as shown in the table in FIG. 5, and the obtained optical fiber arrays 10 were referred to as the Example 2 to Example 8. It is noted that the fiber mounting portion 31 and the ribbon mounting portion 32 have the same length in all the samples. Although in the sample according to each example, as the occupation rate G/W is increased, the number of adhesive grooves 36 is also increased, the adhesive grooves 36 were formed sequentially from near the opening edges of the housing grooves 34 so as to adjoin the adhesive grooves 36a.

Comparative Example 1 to Comparative Example 3

Substrates 30 was produced under the conditions of Comparative Example 1 to Comparative Example 3 shown in the table in FIG. 5 using a cover plate 12, optical fibers 24, and adhesive equivalent to those in the Example 1, and the same processes as shown in the Example 1 were performed to produce optical fiber arrays 10 each having an occupation rate G/W, adhesive groove depth, adhesive groove angle, housing groove depth, and housing groove angle as shown in the table in FIG. 5, and the obtained optical fiber arrays 10 are referred to as the Comparative Example 1 to Comparative Example 3. It is noted that the fiber mounting portion 31 and the ribbon mounting portion 32 have the same length in all the samples.

[Boiling Test]

Boiling tests according to the Example 1 to Example 8 and the Comparative Example 1 to Comparative Example 3 were performed. Water was first boiled, and then each sample was put in the water for a predetermined time to observe the appearance of each sample at predetermined time points (15 h, 36 h, and 60 h).

[Measuring of Coupling Loss]

Figure 6:
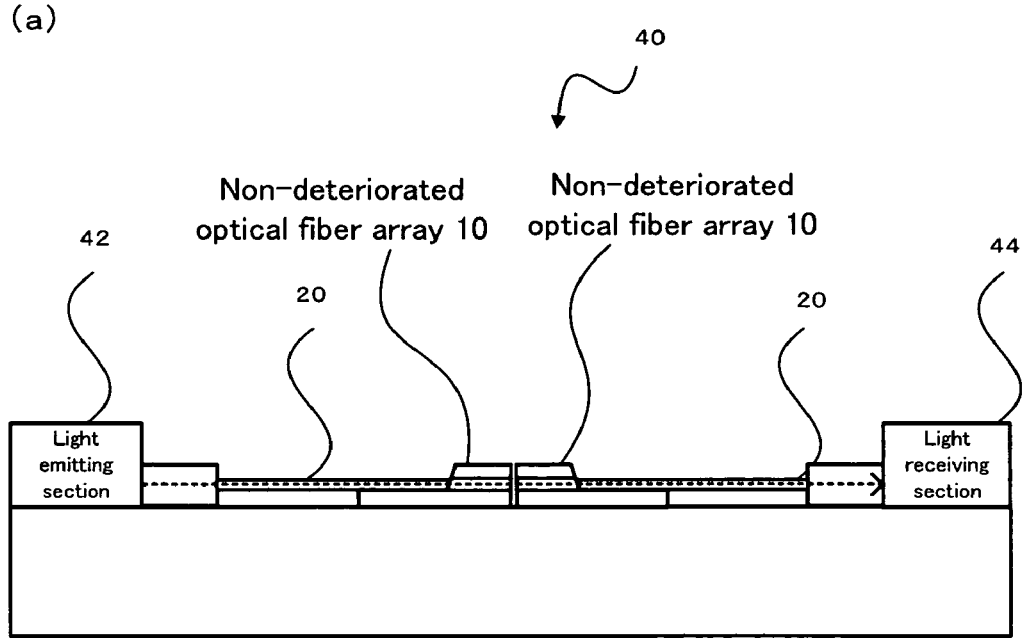
FIG. 6 is an illustrative view of an aligning device 40.
Figure 6:
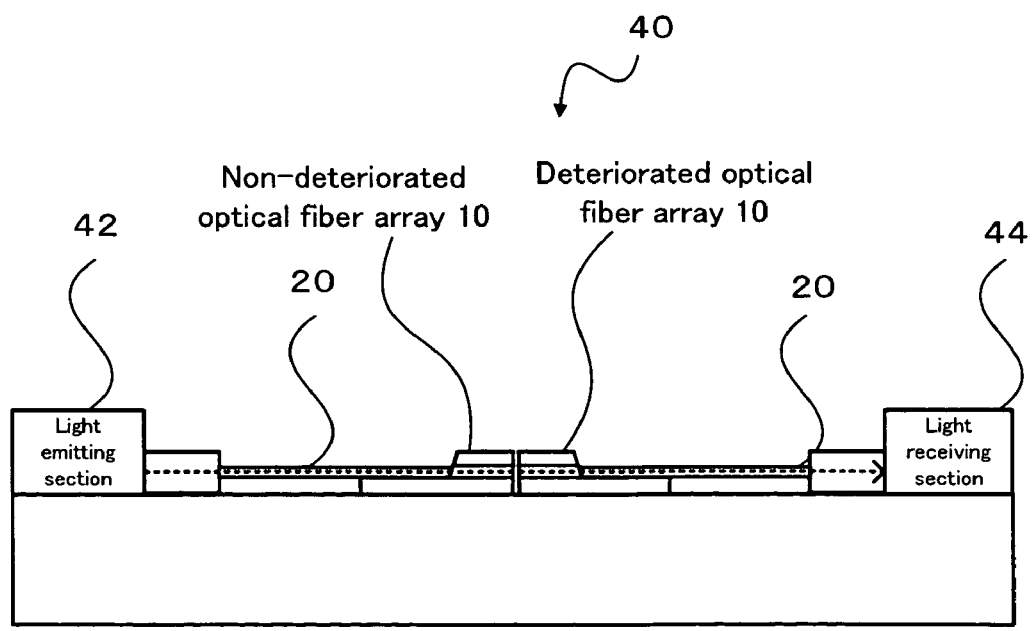

Coupling losses according to the Example 1 to Example 8 and the Comparative Example 1 to Comparative Example 3 were measured. An aligning device 40 (PAW278 manufactured by Moritex Corporation) shown in FIG. 6 was used for the measurements. The measuring method will here be described. Before a boiling test, equivalent optical fiber arrays 10 (e.g. ones according to the Example 1) were first placed to face each other as shown in FIG. 6(a). Light having an input power P1 (1 mW) was input through one optical fiber array 10 arranged on the side of a light emitting section 42 and was output through the other optical fiber array 10 arranged on the side of a light receiving section 44 to measure the output power P2, and the coupling loss L was calculated from the input power P1 and the output power P2 using the following formula (1). It is noted that the measurement was performed by providing a clearance of 1 μm between the optical fiber arrays 10 and by positioning the optical fiber arrays 10 so that the maximum of the output power P2 is to be measured. The result calculated here was defined as an initial value L1 of the coupling loss.

$$\text{Coupling loss } L = 10 \cdot \log(P1/P2) \qquad \text{Formula (1)}$$

Next, the above-described boiling test was performed for 60 hours using the optical fiber array 10 on the output side. As shown in FIG. 6(b), light having an input power P1 (1 mW) was input through the optical fiber array 10, which was not subjected to the boiling test, arranged on the side of the light emitting section 42 and was output through the deteriorated optical fiber array 10, which was subject to the boiling test for 60 hours, arranged on the side of the light receiving section 44 to calculate the coupling loss L2 after the deterioration of the optical fiber array 10 from the input power P1 and the output power P2 using the formula (1). The difference between the initial value L1 and the value L2 after the deterioration was defined as a coupling loss value. It is noted that the coupling loss value is preferably 0.3 dB or less, and more preferably 0.2 dB or less. This is for the reason that since the optical fiber array 10 may be joined with, for example, a splitter for splitting an optical signal into multiple signals, there can occur a loss at every branch when the coupling loss value is more than 0.3 dB, resulting in an excessive coupling loss in total.

[Experimental Results]

The results of the boiling tests and the coupling loss measurements according to the Example 1 to Example 8 and the Comparative Example 1 to Comparative Example 3 are shown in the table in FIG. 7. In the results of the boiling tests, the symbol ○ (circle) indicates a favorable state where no peeling was found between the substrate 30 and the cover plate 12, while the symbol x (cross) indicates a state where peeling occurred between the substrate 30 and the cover plate 12. First, focusing on the Example 1 to Example 5 where the depth of the adhesive grooves 36 is 10 μm and the occupation rate G/W was changed and the Comparative Example 1, from the results of the boiling tests, peeling occurred at 36 h in the Comparative Example 1 where no adhesive groove 36 was formed, while no peeling occurred in the Example 1 to Example 5. From these results, it was found that forming at least one adhesive groove 36 between the outermost housing grooves 34a among the housing grooves 34 in the substrate 30 and the end portions of the substrate 30 allowed the adhesiveness between the substrate 30 and the cover plate 12 to be increased. From the results of the coupling loss measurements, it was also found that forming at least one adhesive groove 36 between the outermost housing grooves 34a among the housing grooves 34 in the substrate 30 and the end portions of the substrate 30 allowed the optical fibers 24 not to be displaced in the housing grooves 34, whereby the coupling loss was not increased, resulting in keeping good transmission characteristics.

Next, focusing on the fourth and Example 6 to Example 8 and the Comparative Example 2 and Comparative Example 3 where the depth of the adhesive grooves 36 was changed and the occupation rate G/W is 0.7, from the results of the boiling tests, peeling occurred at 36 h when the adhesive grooves 36 had a depth of 7 μm, and peeling was also observed at 60 h when the adhesive grooves 36 had a depth of 450 μm, while no peeling was observed in the Example 4 and Example 6 Example 8 even at 60 h. It was found that in the Comparative Example 2, since the adhesive grooves 36 had a small depth, it was difficult to control the behavior of the adhesive layer 16, resulting in insufficient adhesiveness. Also, in the Comparative Example 3, the substrate 30 was warped after the measurement, and peeling occurred at the bottom of the adhesive grooves 36. Accordingly, it was found that when the depth of the adhesive grooves 36 was more than about 200% of that of the housing grooves 34, it might be difficult to fill the adhesive grooves 36 with adhesive, resulting in a reduction in adhesiveness. In consideration of the relationship between the depth in a range of the housing grooves 34 and the depth of the adhesive grooves 36, it was found that when the adhesive grooves 36 had a depth of about 5 to about 200% of that of the housing grooves 34, it was possible to keep good transmission characteristics. It was also estimated that the increase in the adhesiveness between the substrate 30 and the cover plate 12 was contributed by the fact that the substrate 30 and the cover plate 12 were formed of highly optically-transparent (high transmission) glass, and that light to be applied when curing the UV acrylic resin was reflected and scattered at the adhesive grooves 36 to facilitate the degree of curing of the adhesive to be accelerated and the state of curing to be homogenized. It was further estimated that the increase was contributed by the fact that since the degree of curing of the adhesive was accelerated and the state of curing was homogenized, the thermal expansion coefficient of the adhesive layer 16 was reduced to suppress the behavior of the adhesive layer 16.

What is claimed is:

1. An optical fiber array comprising:
    a substrate comprising a plurality of housing grooves configured to house optical fibers therein, the plurality of housing grooves provided in an array between end portions of the substrate;
    a cover plate configured to cover the optical fibers that are housed in the housing grooves;
    an adhesive layer configured to join the substrate with the optical fibers being housed in the housing grooves and with the cover plate;
    a plurality of adhesive grooves formed in the substrate in each area between outermost housing grooves among the housing grooves and respective end portions of the substrate, each of the plurality of adhesive grooves having a depth less than a depth of the housing grooves, wherein:
        each adhesive groove is formed approximately in a cross-sectional V shape,
        an angle between forming faces of the adhesive grooves being approximately 60-80°, and
        a ratio of the depth of the adhesive grooves to the depth of the housing grooves is $\frac{1}{15}$ to 1.

2. The optical fiber array according to claim 1, wherein the adhesive grooves are formed approximately parallel with the housing grooves.

3. The optical fiber array according to claim 1, wherein the adhesive grooves are formed in a vicinity of the outermost housing grooves among the housing grooves.

4. The optical fiber array according to claim 1, wherein the adhesive grooves are formed in a vicinity of the end portions of the substrate.

5. The optical fiber array according to claim 1, wherein the adhesive layer is formed of photosetting resin, and at least one of the substrate and the cover plate is formed of optically-transparent material.

6. The optical fiber array according to claim 1, wherein the value of occupation rate G/W is in a range of about 0.03 to about 1.0, where W is a width between an opening edge of an outermost housing groove and an end portion of the substrate, and G is a total of the widths of the plurality of adhesive grooves formed between the opening edge of the outermost housing groove and the end portion of the substrate, for which W is determined.

7. The optical fiber array according to claim 6, wherein the occupation rate G/W is 0.98 or more.

8. The optical fiber array according to claim 7, wherein said adhesive groove depth is 10 μm and said adhesive groove angle is 70°.

9. The optical fiber array according to claim 6, wherein the occupation rate G/W is 0.05 or less.

10. The optical fiber array according to claim 9, wherein said adhesive groove depth is 10 μm and said adhesive groove angle is 70°.

11. The optical fiber array of claim 1, wherein said V shape, said angle between forming faces and said ratio of depth of the adhesive grooves provide a coupling loss for the optical fiber array to be 0.15 dB or less.

* * * * *